United States Patent [19]

Bond-Harris et al.

[11] Patent Number: 5,990,972
[45] Date of Patent: Nov. 23, 1999

[54] SYSTEM AND METHOD FOR DISPLAYING A VIDEO MENU

[75] Inventors: Laura S. Bond-Harris, Naperville, Ill.;
Cecil A. Dean, Andover, Mass.;
Thomas L. duBreuil, Ivyland, Pa.;
Michael K. Pula, Naperville, Ill.

[73] Assignee: Lucent Technologies, Inc., Murray Hill, N.J.

[21] Appl. No.: 08/734,613

[22] Filed: Oct. 22, 1996

[51] Int. Cl.[6] ...................................................... H04N 5/445
[52] U.S. Cl. .......................... 348/563; 348/564; 348/569; 348/586; 348/589
[58] Field of Search ...................................... 348/563, 564, 348/569, 568, 906, 586, 588, 589, 600, 559, 7, 10, 12, 13; 455/4.2, 5.1, 6.2, 6.3; H04N 5/445

[56] References Cited

U.S. PATENT DOCUMENTS

| | | |
|---|---|---|
| 4,989,081 | 1/1991 | Miyagawa ................................ 348/563 |
| 4,991,011 | 2/1991 | Johnson et al. . |
| 5,291,554 | 3/1994 | Morales . |
| 5,541,738 | 7/1996 | Mankovitz .............................. 348/563 |

*Primary Examiner*—Sherrie Hsia

[57] ABSTRACT

An interactive video menu system provides an economical method for the storage, transmission, and reception of data necessary for interactive video sessions, which allows high-resolution images to be broadcast to end users along with all the control information necessary to display and navigate through these images. A simple interpretive script is run on the end user's device which traps the broadcast information and allows rapid response time and control of the interactive session without requiring expensive high-bandwidth facilities. Buffer equalized coding is used so that still, picture-in-a-still; and moving video images can be compressed at rates below those typically used with the MPEG-2 standard and continuously transmitted as video backgrounds in a seamless loop saving bandwidth without degradation in video quality. Data that instructs the end-user device how to display the video backgrounds and what foreground text to overlay on the video backgrounds is broadcast simultaneously in the bit stream This creates the appearance of a dedicated connection to the server while minimizing bandwidth and equipment cost and complexity.

20 Claims, 3 Drawing Sheets

SYSTEM AND METHOD FOR DISPLAYING A VIDEO MENU

FIELD OF THE INVENTION

The invention relates generally to interactive television systems, and more particularly to a low-bandwidth interactive video menu system.

BACKGROUND OF THE INVENTION

Previous architectures for interactive television systems require high-bandwidth transmission facilities to enable high-resolution images to be displayed and quick response times to be achieved during interactive sessions. This bandwidth is costly in terms of available resources and network elements involved.

Industry efforts have been directed toward developing and improving technology for storing and transporting information using an analog coaxial cable channel. A typical coaxial channel has a bandwidth of about 6 MHz, which accommodates a bit rate of up to about 28 Mbps.

The Motion Picture Experts Group (MPEG), an International Standards Organization (ISO)-sanctioned group provides a standard for full motion digital video compression. The MPEG compression standard for full motion video takes advantage of the fact that full motion video is made up of many successive frames consisting of large areas that are not changed, such as blue sky background. MPEG performs "differencing", that is noting differences between consecutive frames. If two consecutive frames are identical, the second can be stored with the appropriate information.

In server applications it is desirable to convert input data to bit sequences insertable in a bit stream for transmission. For example, according to the MPEG standard, input video data is encoded as compressed bitstreams as specified in the MPEG standard specification: MPEG TEST MODEL 4, "Coded Representation of Picture and Audio Information", ISO-IEC/JTC1/SC29/EG11, CCITT SG XV, Working Party XV/1, Document AVC-445b, February 1993.

Video data can be streamed through a coaxial cable using the MPEG-2 compression standard at a bit rate in a range from 2.5 Mbps through 6 Mbps without noticeable degradation of video imagery, and without artifacts. It is difficult to create an interactive video menu session that creates the appearance of a dedicated session using lower bit rates than that.

Previous interactive video menu architectures require large pipes (i.e., large transmission bandwidth) and costly set-top boxes (STBs) associated with the television. A larger pipe (i.e., more bandwidth) is necessary if compression of the video is performed at a higher speed. Some architectures use locally generated graphics for the background, requiring costly and more complex STBs associated with the television. As a result, there is a continuing need for a low-cost, low-memory menuing system for use in interactive television, which is able to transmit still, moving, or picture-in-picture video images using MPEG-2 compression at below 1.5 Mbps to cost-effectively minimize bandwidth, while maintaining image quality and quick response times.

SUMMARY OF THE INVENTION

The aforementioned deficiencies are addressed and an advance in the art is provided by an interactive video menu system using an economical method for the storage, transmission, and reception of data necessary for interactive video sessions, which allows high-resolution images to be broadcast to end users along with all the control information necessary to display and navigate through these images. A simple interpretive script is run on the end user's device which traps the broadcast information and allows rapid response time and control of the interactive session without requiring expensive high-bandwidth facilities. Buffer equalized coding is used so that still, picture-in-a-still, and moving video images can be compressed at rates below those typically used with the MPEG-2 standard and continuously transmitted as video backgrounds in a seamless loop saving bandwidth without degradation in video quality. Data that instructs the end-user device how to display the video backgrounds and what foreground text to instantiate (i.e., superimpose) over the video backgrounds is broadcast simultaneously in the bit stream This creates the appearance of a dedicated connection to the server while minimizing bandwidth and equipment cost and complexity.

Other features and advantages of the invention will become apparent from the following detailed description, taken in conjunction with the accompanying drawings, which illustrate, by way of example, the features of the invention.

DETAILED DESCRIPTION

The interactive video menu system provides an economical method for the storage, transmission, and reception of data necessary for interactive video sessions, which allows high-resolution images to be broadcast to end users along with all the control information necessary to describe these images and navigate through these images. A simple interpretive script is run on the end user's device which traps the broadcast information and allows the user to receive similar response time and control of the interactive session without requiring expensive high-bandwidth storage, transmission and reception facilities.

Figure 1:
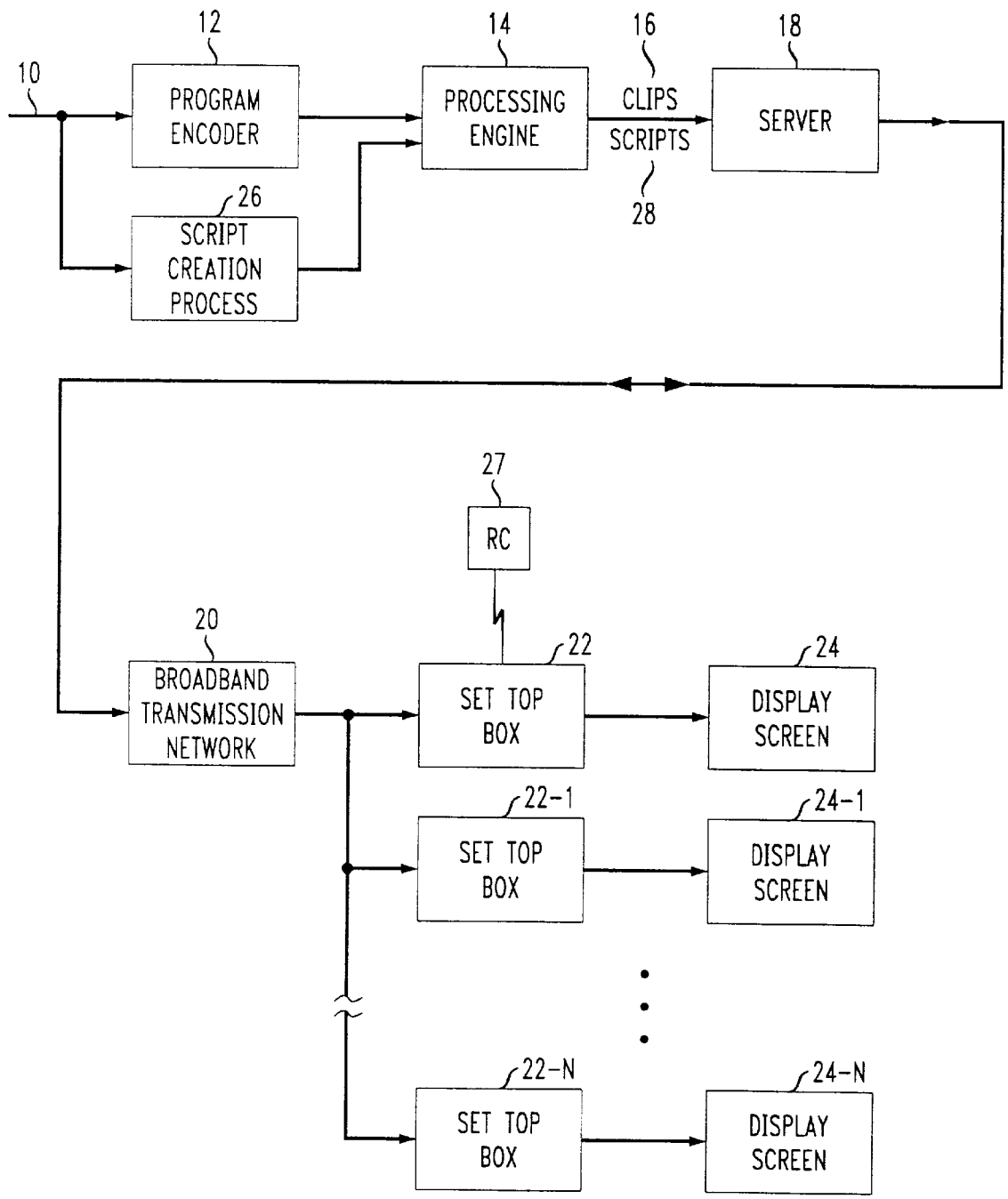
FIG. 1 is a schematic representation of an interactive video menu system according to the principles of the invention.

Referring to FIG. 1, post-produced video images 10 which can be still images, still images with a moving picture-in-picture or moving pictures, are entered into a program encoder 12. The program encoder 12 then compresses the material at a very low bit rate in a range of less than 2.5 Mbps, for example 0.75 Mbps to reduce the amount of storage needed and the bandwidth necessary to transmit them in a broadcast environment through a broadband transmission medium.

In the preferred embodiment, the program encoder 12 is embodied as an AT&T Program Encoder. The encoder parameter settings consist of variable and constant parameters The parameters that stay constant are parameters that encoder developers recommend to stay at a fixed value for best results. The parameters that vary are parameters that most affect the system and when strategically varied can produce optimal video quality. A set of constant and variable parameter settings for the program encoder were determined during an experimental study which allowed a low bit rate to be used with little or no degradation in video quality.

Many other settings can be used with the low bit rate enabled by the invention to provide similar video quality. Such constant and variable parameter settings for the program encoder are presented in TABLE I.

TABLE I

CONSTANT PARAMETER SETTINGS:

| | |
|---|---|
| Vertical Size: full | Gamma Correction: Normal |
| Film Detection | Signal Mode: NTSC |
| Threshold: Expect | Refresh Mode: I-frames |
| Macro Block Refresh | I-Frame on Scene Change: Enable |
| Modulus: 22 | Perceptual Model: Enable |
| Sequence Header Rate: Fixed Rate | Half Pel Motion Estimation: Enable Compressed Buffer Size Inter |
| Sequence Rate (every n frames): 30 | Quantizer: Default PCR PID = Video PID: Enable |
| Maximum Coefficients/Macro Block: 20 | PCR Rate (30 Hz periods): 30 |
| Maximum Bits/Macro Block: 20k | |
| Intra Quantizer: Default | |
| Video PES Generation: Enable | |
| Video PES Rate = 0 | |

VARIABLE PARAMETER SETTINGS:

| | |
|---|---|
| Video PID: variable | PCR PID: variable |
| Audio PID: variable | |
| Filter Value: (1–15) | Bit Rate (.5–12 Mb/s) |
| Slice Size: (11, 22 or 44 Mb) | Horizontal Resolution (352 or 704 pels) |

The compressed images from the program encoder 12 are then sent to a processing engine 14 where they are processed to attain "buffer equalized coding" in accordance with the principles of the invention. Buffer equalized coding is the subject of copending U.S. patent application Ser. No. 08/327,176 filed Oct. 21, 1994 entitled "METHOD FOR CONTROLLING A COMPRESSED DATA BUFFER", which is incorporated by reference as if fully set forth herein. U.S. patent application Ser. No. 08/327,176 relates to data buffers and, in particular, to controlling a data buffer for transmitting video data compressed according to MPEG standards That patent application describes in detail a system which includes an encoder for encoding input data as a first bit sequence. A processor includes the data buffer and is operatively associated with the encoder for detecting a condition of the first bit sequence having a size less than a predetermined size, and for converting the first bit sequence to a modified bit sequence, which has the predetermined size, in the bit stream That system includes a decoder for decoding the modified bit sequence. The processor generates the modified bit sequence by inserting at least one predetermined bit, such as a logical 0 bit, into the first bit sequence. In addition, the encoder and decoder include means for encoding and decoding, respectively, the input data according to Motion Picture Experts Group (MPEG) standards, with the decoder buffer having a predetermined fixed capacity.

Thus, the data buffer is controlled by receiving input data; encoding the input data using the encoder to generate a first bit sequence; and detecting a condition of the first bit sequence having a size less than a predetermined size. The first bit sequence having a size less than the predetermined size is converted to a modified bit sequence in the bitstream which has the predetermined size. The bitstream is received and the modified bit sequence is decoded. Buffer equalized coding facilitates editing. The set of modified bit sequences, assembled in an arbitrary order, are decodable by the decoder to generate a decoded output signal free of editing artifacts. Such concatenatable modified bit sequences provide seamless switching between bitstreams without gaps or loss of data caused by buffer overflows or underflows. As a results only a short "clip" (five seconds minimum) of the video image is needed for the next steps of the present invention The compressed, buffer-equalized-coded clip 16 is then stored on a server 18. The server 18 then outputs the buffer-equalized-coded clip 16 in a continuous loop, which repeats, for example, every five seconds (i.e., replaying the clip over and over again) in the bit stream.

According to the principles of the invention, the short buffer-equalized clip is transported via a broadband transmission network 20 to a set-top box ("STB") 22 of an end-user device which is coupled to the broadband transmission network. It is contemplated that the set-top box can be any type of digital video player (DVP) digital video home terminal (DVHT), or equivalent. The STB 22 plays the clip continuously and seamlessly for an indefinite amount of time without having any decoder resets or video artifacts show on the display screen 24 of the end-user device. The inventive technique creates storage savings in the server 18 that is playing the clip 16. The server uses less memory to store the short clip. The clip 16 can be used for many purposes, for example, as a background image for on-screen display of text, graphics or other material that changes locally (e.g. a "menu selection" screen); and as a barker channel The buffer-equalized clip provides a low-bandwidth seamless loop for the set-top box 22 to display. Multiple clips can be sent simultaneously to give each menu page a different "look and feel" depending on what the user is doing.

The post-produced video images 10 are also fed to a script creation process 26. At the script creation process authors output (a) text based on the post-produced video material 10 to be displayed as foreground, along with (b) simple instructions for the STB on what to do with the text and how to respond to navigation commands (e.g., via handheld wireless remote control ("RC") 27 or keypad button pushes) from the user.

The foreground text and the instructions, forming the interpretive script, are then sent to the processing engine 14. The processing engine assembles the script into a small number of packets 28, which are then associated with the buffer-equalized (i.e., compressed and processed with buffer equalized coding) clip 16.

In an alternate embodiment, audio clips are used to provide help and instructions to the user in conjunction with the displayed background video screens and foreground text. The audio clips can be any type of music, sounds and/or vocal instructions.

The clips and scripts are both loaded into the server 18 in the form of MPEG-2 transport streams. A number of buffer equalized clips 16 and interpretive script packets 28 are broadcast continuously and simultaneously to all the set-top boxes 22, 22-1, . . . 22-N (where N is an integer) coupled to the broadband transmission network 20 throughout the network of end-user devices. There is generally one clip associated with one script packet for each menu or application page in the menu system. In some cases, however, multiple interpretive script packets 28 can be associated with the same single buffer-equalized clip 16. This saves bandwidth by reducing the number of clips 16 that need to be broadcast.

In the interactive video menu network according to the invention, all STBs 22, 22-1, . . . 22-N coupled to the broadband transmission medium 20 receive the same clips 16 and script packets 28. Each STB 22, 22-1, . . . 22-N operates to display the video clips 16 on the network of display screens 24, 24-1, . . . 24-N and, based on the text and instructions indicated by the interpretive script packets 28, add foreground text overlay to each display screen 24, 24-1 . . . 24-N to present on each display screen a video image combined with text that includes a menu page.

There are different methods of controlling the end-user device to support the session in accordance with the interactive video menu system invention. A first method involves loading the whole program into the end-user device. A second method involves sending queries upstream to the server requesting instructions and waiting for the responses indicating instructions A third method as taught herein involves constantly looking in the continuous bit stream for instructions contained in the scripts. According to the third method of the invention, some software resides in the end-user device for interpreting the script packets (foreground text and instructions) as instructions are received. This minimizes the memory required for the end-user device in balance with the number of upstream queries to the server for instructions so as to more efficiently use the limited upstream bandwidth. Retrieving instructions from the script packets in the continuous bit stream takes a little longer than if all the instructions were initially loaded in the end-user device. However, the delay is small, being in a range from about 0.1 ms to 1 ms, in terms of response time during the interactive session.

The user is able to give commands to the system during the interactive session using the remote control 27. Each STB decodes instructions in the interpretive script packets 28 to react to the user's navigation commands, which are based on the displayed menu page creating a virtual interactive session. In the virtual interactive session, each STB 22 reacts to the user's navigation commands with similar response time and control of the interactive session as if each STB had a dedicated session connected to the server 18. This virtual interactive session saves bandwidth and avoids expensive facilities by not requiring a dedicated connection from the server 18 to each STB 22, 22-1, . . . 22-N in the network and using less upstream transmission equipment and bandwidth because the number of upstream messages and queries sent back to the server 18 is reduced in this design.

Many of the services that require interface with an end-user employ still menus as the interface format. In the interactive video menu system taught herein, menu pages are created by authors at the script creation process 26. The authors define the specific actions that occur whenever a button (on the remote control 27 or STB 22) is pressed by the user in response to a displayed menu. The script creation process is a development station at which an author can, for example, use a computer to add foreground text to video backgrounds to see how the overlaid text looks on the background, and create the logic and/or code in the scripts. Examples of these actions are "HIGHLIGHT THE NEXT OPTION IN THE MENU", "DISPLAY THE NEXT MENU PAGE" and "SEND A MESSAGE UPSTREAM THAT THE USER WANTS TO BUY MOVIE X". These actions are translated into scripts (i.e. with coding) that the STB understands. These scripts are designed to work with the STB regardless of the video decoder used in the STB. The STB is capable of receiving those scripts and, in a run-time environment, executing the scripts. The script creation process 26 defines the behavior associated with each of the menus, including the navigational controls and specific "hot spots" of the menu on the display screen 24. The effect of the buttons on the end user's remote control 27 is determined according to these scripts.

The processing engine 14 encodes these video backgrounds and scripts into compressed MPEG-2 video bit streams with the accompanying scripts in the private data sections of the MPEG-2 bit streams or some other part of the stream. The MPEG-2 transport streams are stored in the server 18. In an exemplary embodiment of the interactive video menu system the number of menus available for delivery is thirty-six (36) menus per 6 MHz channel encoded at 0.75 mbps. The benefits of this implementation are minimal network traffic, predictable latencies, and minimal set-top box complexity.

The server 18 sends all the menu information on predetermined Program Identifications (PIDs) in a 6 MHz channel of the broadband transmission network. Whenever the menus need to be displayed, the STB 22 tunes to the 6 MHz channel and the appropriate PIDs. The first menu PIDs and tuning information are prestored in the STB or broadcast at a low speed rate through the signaling channel, which is at a different frequency from the MPEG-2 frequency, and are stored in the STB.

When the user enters a menus the STB 22 reads the private data (identified by PID number) associated with that menu and interprets the scripts 28 to respond to user actions The scripts 28 are interpreted and executed in a run-time environment in the STB 22. If the user makes menu selections that require a new menu to be displayed, the STB looks in the script of the current menu to determine where to look for the next menu. It then tunes to the next menu and reads the private data (identified by an appropriate PID number) that contains the scripts for that menu. At some point in time the user may make a selection, such as ordering an event (e.g., a movie) that requires the STB 22 to send a message or query upstream to the server 18. The command to send the message upstream and the format of the message, which conforms to predefined application programming interfaces (APIs) for the server and the STB, are also contained in the scripts.

When the user purchases an event such as a movie, the STB 22 sends a message upstream indicating the purchase request. The server 18 allocates bandwidth and gets authorization from the access control manager and then sends a confirmation message to the STB 22. The confirmation message can includes for examples information such as: movie title, time to showing, and prices The STB then tunes to another menu screen (as dictated by the script associated with the previous menu) that has blank fields which the STB fills up with bit-mapped characters that show, for example, the movie title, time to showing, etc. The purpose of the blank fields is so that the "look and feel" of the confirmation menu is similar to that of previous menus. The STB 22 is instructed concerning what characters to display and where.

The user interface is designed to be responsive to user commands while minimizing back-channel (i.e., upstream) communication with the server 18. One user interface with the STB for ordering services is via remote control 27 and on-screen (e.g., TV or monitor screen) display of text and/or images. Alternatively, the user may utilize a keypad on the STB to enter commands. The user is presented with menus which facilitate navigating through the labyrinth of options and making a selection using the remote control or keypad.

Figure 2:
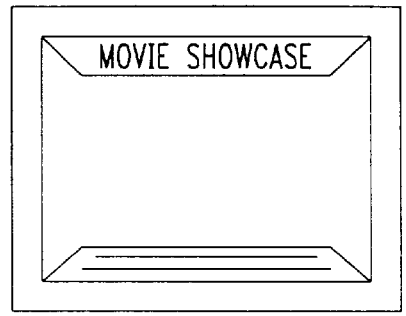
FIGS. 2–5 show several clips displayed as video backgrounds according to the principles of the invention.
Figure 3:
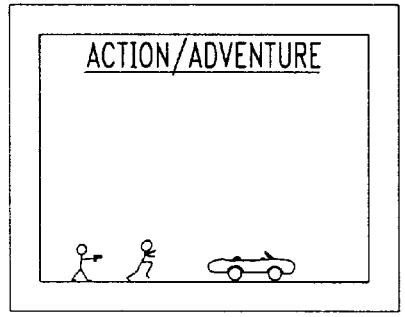
Figure 4:
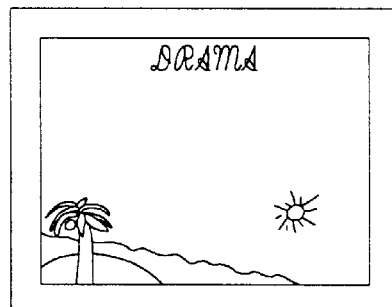
Figure 5:
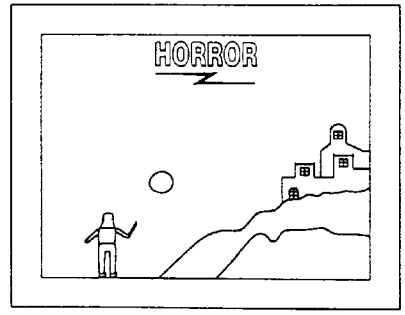
Figure 6:
FIGS. 6–8 show a series of displayed menus with foreground text instantiated over video backgrounds according to the principles of the inventions.
Figure 7:
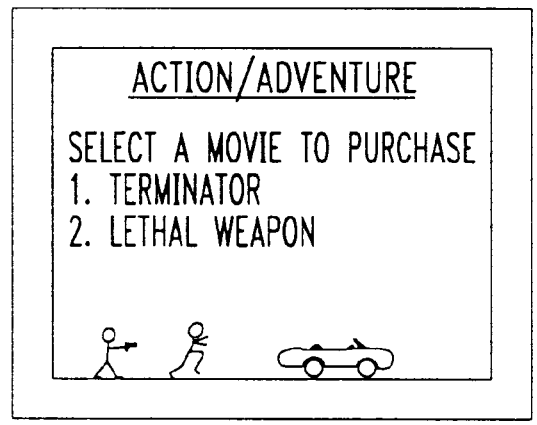
Figure 8:

The following illustrates how an event, such as a movie, can be ordered in an exemplary interactive session between the interactive video menu system and the user. The user is able to give commands to the system either using the remote control 27 or with the keypad on the STB 22 in order to navigate through a series of menus for ordering the movies The scripts 28 direct the system to respond to the user commands and control the foreground text and the background video images displayed as menu pages on the display screen 24 during the interactive session. FIGS. 2–5 show four exemplary clips which can be displayed as video backgrounds at various points during the interactive session, and on which foreground text can be overlaid by the system according to the invention. FIG. 2 represents a clip A. FIG. 3 represents a clip B. FIG. 4 represents a clip C. FIG. 5 represents a clip D. FIGS. 6–8 each show a combined background video image and foreground text instantiated (i.e., superimposed) thereon produced on the display screen 24 for the user during this example of an interactive session.

The clips and scripts are continuously and simultaneously being bit-streamed through the broadband transmission network to the STB of the end-user device. The following represent five exemplary simplified pseudo-scripts used in the system:

---
SCRIPT 0

Use clip A
Display "WELCOME, SELECT A CATEGORY"
Display "1. ACTION/ADVENTURE"
Display "2. DRAMA"
Display "3. HORROR"
etc.
If user selects 1 then retrieve script 1
If user selects 2 then retrieve script 2
If user selects 3 then retrieve script 3
etc.

SCRIPT 1

Use clip B
Display "SELECT A MOVIE TO PURCHASE"
Display "1. TERMINATOR"
Display "2. LETHAL WEAPON"
etc.
If user selects 1 then retrieve script 4 with "TERMINATOR" selection inserted
If user selects 2 then retrieve script 4 with "LETHAL WEAPON" selection inserted
etc.

SCRIPT 2

Use clip C
etc.
(For DRAMA selections)

SCRIPT 3

Use clip D
etc.
(For HORROR selections)

SCRIPT 4

Use clip A
Dispaly "YOU HAVE PURCHASED"
Display "<title of selection inserted>"
Display "ENJOY THE MOVIE!"
Send message upstream to server: user purchased <title of selection inserted>, play it now for subscriber no. 1234
When movie ends, retrieve SCRIPT 0

---

Turning to FIGS. 2–8 in view of SCRIPTS 0–4, FIG. 6 shows what would initially be displayed on the display screen (e.g., a television screen) for the user to work with according to SCRIPT 0. Assume the user selects "1"from the menu page displayed in FIG. 6. Then the menu page displayed in FIG. 7 would be shown on the display screen 24 of the end-user device according to SCRIPT 1. Assume the user decides to select "1"from the menu page displayed in FIG. 7 and depresses the appropriate button on the remote control 27. Then the menu page displayed in FIG. 8 would be shown on the display screen 24 of the end-user device for the user according to SCRIPT 4. In FIG. 8, the foreground text "YOU HAVE PURCHASED" and "ENJOY THE MOVIE!" is instantiated (i.e., superimposed) over the background video image corresponding to clip A. The title of the selection, "TERMINATOR", is inserted in a field between the phrases "YOU HAVE PURCHASED" and "ENJOY THE MOVIE!" so as to also be instantiated over the background video image on the display screen for the user to see. Then the movie plays, and the user or subscriber can be billed accordingly.

The user has thus navigated through multiple screens without an excessive number of upstream messages to the server 18. This minimizes the required upstream bandwidth and equipment cost of the interactive video menu system.

The interactive video menu system is designed to support the user interface and also to minimize the costs associated with the STB. Menu delivery uses an interactive application in which video backgrounds audio, foreground text overlay data, and instructions are compressed and loaded onto the server. Upon loading this content, the server computes the necessary MPEG Program Identification (PID) mapping information and stores this information for broadcast into the broadband transmission network. The server continuously broadcasts the information through the broadband transmission network. The broadcast of the menuing system occupies one or more 6 MHz RF channels. The STB is provisioned with such RF channels identified as menuing channels such that the STB application can translate user navigational commands to menu selections and server specific messages.

While several particular forms of the invention have been illustrated and described, it will also be apparent that various modifications can be made without departing from the spirit and scope of the invention.

What is claimed is:

1. An interactive video menu system which can display a video menu to a user, comprising:

a program encoder for compressing post-produced video material and generating compressed background video images;

a script station which outputs (a) foreground text data based on the post-produced video material, and (b) instructions for (i) displaying the foreground text data to overlay the background video images, and (ii) responding to a command from the user based on the video menu, wherein the foreground text data and the instructions form a script;

a processing engine coupled to the program encoder and to the script station which (i) processes the compressed background video images to generate a clip, and (ii) assembles the script into a number of script packets which are associated with the clip;

a server coupled to the processing engine which (i) stores the clip, and (ii) continuously broadcasts the clip simultaneously with the associated script packets into a broadband transmission medium; and an end-user device coupled to the broadband transmission medium to receive the clip and associated script packets, which (i) using the clip, displays the background video images, and (ii) using the script packets, overlays foreground text on the displayed background video images.

2. A system as defined in claim 1, wherein:

a single script packet is associated with each clip.

3. A system as defined in claim 1, wherein:

a plurality of script packets are associated with each clip.

4. A system as defined in claim 1, wherein:

the clip is sent in a first digital channel, and the script is sent in a second digital channel.

5. A system as defined in claim 1, wherein:

the clip is broadcast at a bit rate of less than 2.5 Mbps.

6. A system as defined in claim 1, wherein:

the processing engine uses buffer equalized coding in processing the compressed background video images.

7. A system as defined in claim 1, wherein:

the server stores a number of clips.

8. A system as defined in claim 1, wherein the end-user device compromises:

a display screen and a remote control.

9. A system as defined in claim 1, further comprising:

one or more additional end-user devices coupled to the broadband transmission medium, wherein each additional end-user device receives the clip and associated script packets.

10. A system for displaying a menu in an interactive video system, comprising:

(A) means for compressing post-produced video material to create compressed background video images;

(B) means for creating (i) foreground text data based on the post-produced video material and (ii) instructions for overlaying foreground text on the background video images and for responding to a command from a user, wherein the foreground text data and the instructions form a script;

(C) means for processing the compressed background video images using buffer equalized coding to generate a clip;

(D) means for assembling the script into a number of script packets which are associated with the clip;

(E) means for continuously broadcasting a number of buffer-equalized clips and associated script packets into a broadband transmission medium; and (F) means, coupled to the broadband transmission medium, for displaying the background video images and foreground text instantiated over the displayed background video images.

11. A system as defined in claim 10, wherein:

the number of clips and associated script packets are broadcast simultaneously.

12. A system as defined in claim 10, wherein:

the means for displaying uses the clips to display the background video images.

13. A system as defined in claim 10, wherein:

the means for displaying uses the script packets to instantiate the foreground text over the displayed background video images.

14. A system as defined in claim 10, wherein the means for displaying includes:

plurality of end-user devices.

15. A process for creating a video image with text that includes a menu page for use in an interactive video menu system, comprising the following steps:

(A) broadcasting into a broadband transmission medium a bit stream of buffer-equalized clips and script packets;

(B) based on the clips, displaying background video images on an end-user device coupled to the broadband transmission medium; and (C) based on the script packets, instantiating foreground text over the displayed background video images to present the video image with text that includes a menu page.

16. A process as defined in claim 15, wherein:

the buffer-equalized clips are compressed according to the MPEG-2 standard.

17. A process as defined in claim 15 wherein:

the clips indicate the background video images to be displayed, and the script packets indicate the foreground text and instructions for instantiating the foreground text over the background video images and for responding to user commands.

18. A process as defined in claim 15, wherein:

one or more script packets are associated with each of the clips.

19. A process as defined in claim 15, wherein:

the clips and script packets are broadcast simultaneously in step (A).

20. A process as defined in claim 15, wherein:

the end-user device is part of a network of end-user devices, wherein each end-user device of the network receives the bit stream of clips and script packets.

* * * * *